(12) United States Patent
Adachi (10) Patent No.: US 11,352,778 B2
(45) Date of Patent: Jun. 7, 2022

(54) METAL JOINT

(71) Applicant: SHELTER CO., LTD., Yamagata (JP)

(72) Inventor: Hiroyuki Adachi, Yamagata (JP)

(73) Assignee: SHELTER CO., LTD.

( * ) Notice: Subject to any disclaimer, the term of this patent is extended or adjusted under 35 U.S.C. 154(b) by 0 days.

(21) Appl. No.: 16/342,790

(22) PCT Filed: Oct. 17, 2017

(86) PCT No.: PCT/JP2017/037594
§ 371 (c)(1),
(2) Date: Apr. 17, 2019

(87) PCT Pub. No.: WO2018/074489
PCT Pub. Date: Apr. 26, 2018

(65) Prior Publication Data
US 2020/0056368 A1 Feb. 20, 2020

(30) Foreign Application Priority Data

Oct. 18, 2016 (JP) .............................. JP2016-204720

(51) Int. Cl.
*F16B 13/00* (2006.01)
*E04B 1/41* (2006.01)
(Continued)

(52) U.S. Cl.
CPC .............. *E04B 1/40* (2013.01); *E04B 1/2604* (2013.01); *E04B 2001/266* (2013.01); *E04B 2001/2692* (2013.01); *F16B 13/141* (2013.01)

(58) Field of Classification Search
CPC . E04B 1/40; E04B 1/41; E04B 1/4114; E04B 1/4121; E04B 1/4135;
(Continued)

(56) References Cited

U.S. PATENT DOCUMENTS

| 36,014 A | * | 7/1862 | Meissner | F16B 35/041 411/392 |
| 1,243,818 A | * | 10/1917 | Cummins | F16B 37/122 470/8 |

(Continued)

FOREIGN PATENT DOCUMENTS

| DE | 7024434 U | 2/1971 |
| DE | 3641502 A1 | 6/1988 |

(Continued)

OTHER PUBLICATIONS

International Preliminary Report on Patentability for Application No. PCT/JP2017/037594 dated May 2, 2019, 8 pages.

(Continued)

*Primary Examiner* — Kyle J. Walraed-Sullivan
(74) *Attorney, Agent, or Firm* — Lerner, David, Littenberg, Krumholz & Mentlik, LLP (57) ABSTRACT

A metal joint adapted to be fitted into a hole formed in a building component and fixed to the hole with an adhesive includes: a small diameter portion having an elongated shape and an outer diameter smaller than an inner diameter of the hole; and two large diameter portions fixed to the small diameter portion individually at two locations spaced apart from each other in a longitudinal direction of the small diameter portion, each large diameter portion having an outer diameter corresponding to the inner diameter of the hole. Furthermore, irregularities are formed on an outer peripheral surface of the small diameter portion in a section between the two large diameter portions.

9 Claims, 11 Drawing Sheets (51) Int. Cl.
   *E04B 1/26* (2006.01)
   *F16B 13/14* (2006.01)
(58) Field of Classification Search
   CPC .............. E04B 1/4157; E04B 1/4164; E04B 2001/266; E04B 2001/2692; F16B 13/141; F16B 37/122; F16B 33/004; F16B 292/43; F16B 292/55; F16B 292/90; F16B 292/176; F16B 292/149; F16B 292/212; F16B 292/251; F16B 292/294
   USPC ....... 411/82.1; 292/3, 55, 90, 176, 149, 212, 292/251, 294
   See application file for complete search history.

(56) References Cited

U.S. PATENT DOCUMENTS

| | | | | |
|---|---|---|---|---|
| 2,398,984 | A * | 4/1946 | Welch | F16B 25/0015 411/511 |
| 4,185,438 | A * | 1/1980 | Fischer | F16B 13/141 52/704 |
| 4,386,882 | A * | 6/1983 | Bereiter | F16B 13/002 411/387.1 |
| 4,452,023 | A * | 6/1984 | Stahlberg | E04D 3/3603 411/34 |
| 4,647,883 | A * | 3/1987 | Oxley | F16B 19/02 333/232 |
| 4,776,143 | A * | 10/1988 | Pointner | E04F 13/0853 405/259.5 |
| 5,145,301 | A | 9/1992 | Yamamoto | |
| 5,145,361 | A * | 9/1992 | Kurzinski | F23D 14/32 431/10 |
| 5,219,452 | A * | 6/1993 | Yamamoto | F16B 13/141 411/82.1 |
| 5,230,191 | A * | 7/1993 | Mayrand | B28B 7/0088 52/259 |
| 6,499,267 | B1 * | 12/2002 | Ayrle | F16B 13/141 405/259.5 |
| 7,823,356 | B2 | 11/2010 | Tanaka | |
| 7,827,759 | B1 * | 11/2010 | Barnes | E04G 23/0203 52/220.8 |
| 8,398,690 | B2 * | 3/2013 | Bottlang | A61B 17/8057 606/286 |
| 9,200,661 | B2 * | 12/2015 | Bosco | F16B 25/0057 |
| 10,478,238 | B2 * | 11/2019 | Palmer | A61B 17/7019 |
| 2004/0033120 | A1 * | 2/2004 | Ducker, III | F16B 35/06 411/82.1 |
| 2004/0109738 | A1 * | 6/2004 | Ducker, III | F16B 35/041 411/82.1 |
| 2004/0168397 | A1 * | 9/2004 | Gruen | F16B 13/141 52/704 |
| 2006/0005477 | A1 * | 1/2006 | Yang | E04H 9/021 52/167.7 |
| 2007/0175127 | A1 | 8/2007 | Tanaka | |
| 2008/0226413 | A1 * | 9/2008 | Stephen | F16B 37/12 411/82.1 |
| 2010/0318130 | A1 * | 12/2010 | Parlato | A61B 17/702 606/254 |
| 2012/0180423 | A1 * | 7/2012 | Avila | E04B 1/4157 52/700 |
| 2013/0002103 | A1 * | 1/2013 | Peng | F16B 37/122 312/223.1 |
| 2013/0008096 | A1 * | 1/2013 | Griffiths | E01F 9/635 52/99 |
| 2014/0050550 | A1 * | 2/2014 | Stempniewski | F16B 13/065 411/360 |
| 2014/0072384 | A1 * | 3/2014 | Wissling | F16B 13/065 411/44 |
| 2015/0075106 | A1 * | 3/2015 | Vandenbempt | E04B 2/18 52/596 |
| 2015/0151504 | A1 * | 6/2015 | Yang | B32B 3/266 428/99 |
| 2015/0152907 | A1 * | 6/2015 | Silas | F16B 37/005 52/705 |
| 2015/0218797 | A1 * | 8/2015 | Scherer | C22C 38/02 52/704 |
| 2017/0226731 | A1 * | 8/2017 | Chamberlain | E04B 5/40 |
| 2018/0002885 | A1 * | 1/2018 | Sun | F24S 25/617 |
| 2018/0320378 | A1 * | 11/2018 | Fenske | E04C 5/12 |

FOREIGN PATENT DOCUMENTS

| | | | | |
|---|---|---|---|---|
| DE | 102012215587 A1 | 6/2014 | | |
| DE | 202014002242 U1 | 6/2014 | | |
| DE | 102014205448 A1 * | 9/2015 | | F16B 5/025 |
| FR | 1434225 A | 4/1966 | | |
| GB | 2563452 A * | 12/2018 | | F16B 35/06 |
| JP | H10311110 A | 11/1998 | | |
| JP | 2000160681 A | 6/2000 | | |
| JP | 2001214540 A | 8/2001 | | |
| JP | 2012140820 A | 7/2012 | | |
| JP | 201425244 A | 2/2014 | | |
| JP | 5566553 B1 | 8/2014 | | |
| JP | 2015209630 A | 11/2015 | | |
| JP | 2016037797 A | 3/2016 | | |
| TW | I324653 B | 5/2010 | | |

OTHER PUBLICATIONS

International Search Report for PCT/JP2017/037594, dated Dec. 26, 2017.
Japanese Office Action for JP Application No. 2016204720, dated Aug. 1, 2017.
Extended European Search Report with Written Opinion for Application No. 17862674 dated Apr. 30, 2020, 6 pages.
Chinese Office Action including Search Report for Application No. 201780058301.1, dated May 28, 2020, pp. 1-7. (English translation attached).
Search Report from Chinese Office Action for Application No. 201780058301.1 dated Jan. 22, 2021; 2 pages.
Second Office Action for Chinese Patent Application No. 201780058301.1 dated Jan. 22, 2021; 6 pages.
Taiwanese Office Action for Application No. 106135361, dated Mar. 25, 2021, 5 pages.
Korean Office Action dated Jul. 30, 2021 in Appln. No. 10-2019-7009793; 6 pages.
Taiwanese Office Action dated Nov. 3, 2021 in Taiwan Appln. No. 106135361, 4 pgs.

* cited by examiner

METAL JOINT

CROSS-REFERENCE TO RELATED APPLICATIONS

The present application is a national phase entry under 35 U.S.C. § 371 of International Application No. PCT/JP2017/037594, filed Oct. 17, 2017, published in Japanese, which claims priority from Japanese Patent Application No. 2016-204720, filed on Oct. 18, 2016, the disclosures of which are hereby incorporated herein by reference.

TECHNICAL FIELD

The present invention relates to a metal joint for use in glued-in rod connection.

BACKGROUND ART

In a timber building, high load-bearing and rigid joins are required. To satisfy such needs, glued-in rods (GIRs) as disclosed in JP 2016-37797 A (Patent Document 1) have been used recently. When used, the GIR is fitted into a hole formed in a building component such as a vertical or horizontal wooden structural member, and fixed to the building component with an adhesive such as an epoxy resin.

REFERENCE DOCUMENT LIST

Patent Document

Patent Document 1: JP 2016-37797 A

SUMMARY OF THE INVENTION

Problem to be Solved by the Invention

Specifically, the GIR is fitted to the building component with a gap to be filled with an adhesive between the GIR and the hole of the building component. Such a gap undesirably permits the hole of the building component and the GIR to be displaced relative to each other by a distance depending on the gap. This deteriorates positioning accuracy of the GIR with respect to the hole of the building component. Thus, for example, using the GIR to join a vertical structural member and a horizontal structural member may cause a position gap therebetween at the join.

Therefore, the present invention has been made to provide a metal joint providing an improved positioning accuracy with respect to a hole of a building component.

Means for Solving the Problem

To this end, a metal joint adapted to be fitted into a hole formed in a building component and fixed to the hole with an adhesive includes: a small diameter portion having an elongated shape and an outer diameter smaller than an inner diameter of the hole; and two large diameter portions fixed to the small diameter portion individually at two locations spaced apart from each other in a longitudinal direction of the small diameter portion, each large diameter portion having an outer diameter corresponding to the inner diameter of the hole. Furthermore, irregularities are formed on an outer peripheral surface of the small diameter portion in a section between the two large diameter portions.

Effects of the Invention

The present invention provides improved positioning accuracy with respect to a hole of a building component.

MODES FOR CARRYING OUT THE INVENTION

Embodiments for implementing the present invention will be described in detail below with reference to the accompanying drawings.

Figure 1:
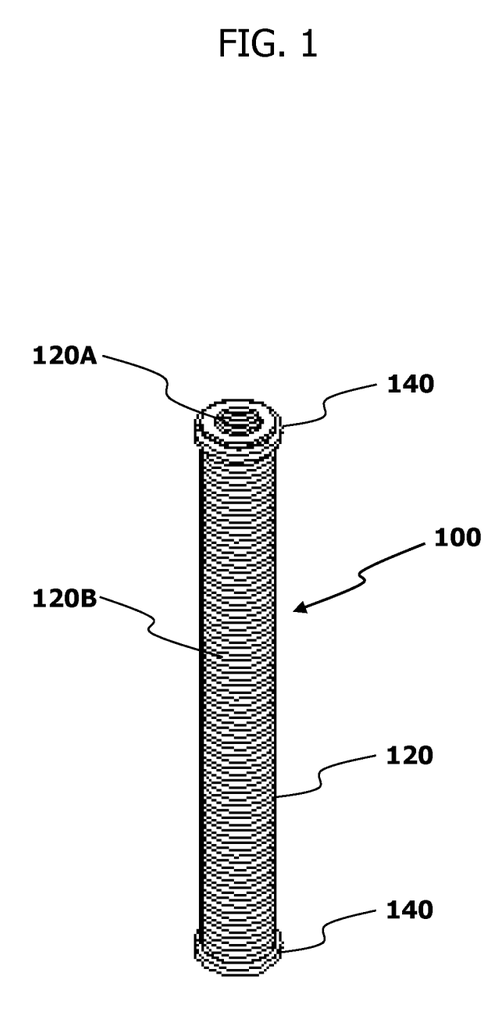
FIG. 1 is a perspective view of an example of a GIR for joining building components together.

FIG. 1 shows an example of a glued-in rod (GIR) 100 for joining wooden building components together. Here, the GIR 100 may be an example of a metal joint. The GIR 100 may be used for building components including vertical structural members, such as posts, and horizontal structural members, such as beams and groundsills. Note that each of the horizontal and vertical structural members may be made of solid wood, laminated wood, or a combination thereof.

The GIR 100 is made of, for example, a rolled steel for general structural applications, such as SS400, and has a small diameter portion 120 and two large diameter portions 140. The small diameter portion 120 has an elongated shape and a circular cross section. The large diameter portions 140 are fixed individually at locations spaced apart from each other in the longitudinal direction of the small diameter portion 120. As used herein, the term "circular" refers not only to a perfect circle but also to a substantially and seemingly circular shape (the same applies to other shape-related terms herein).

Figure 2:
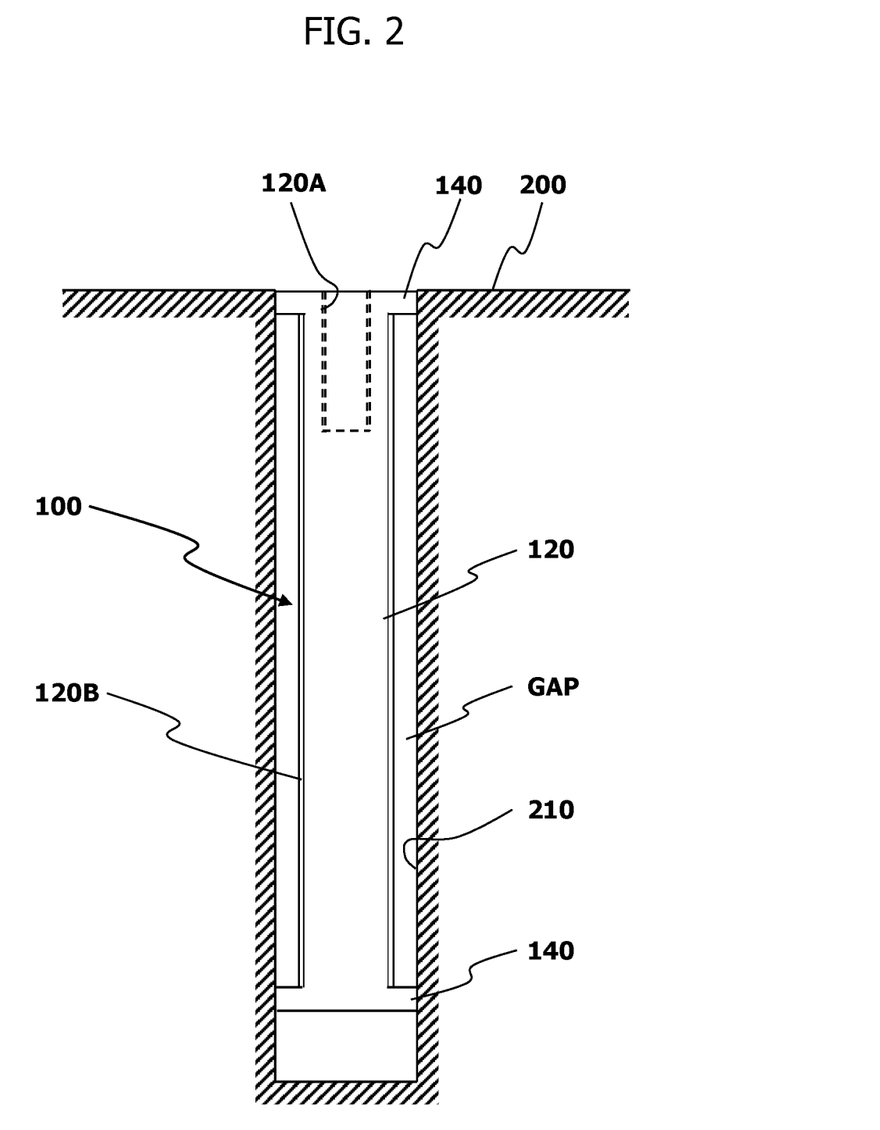
FIG. 2 is a vertical cross-sectional view of the GIR fixed to a building component.

As shown in FIG. 2, the entire length of the small diameter portion 120 is adapted such that the small diameter portion 120 can be entirely accommodated in a hole 210 extending in a building component 200 from one surface thereof in the direction perpendicular to the one surface. Furthermore, the outer diameter of the small diameter portion 120 is smaller than the inner diameter of the hole 210 such that a cylindrical gap GAP is created between the small diameter portion 120 and the inner periphery of the hole 210 when the GIR 100 is fitted into the hole 210. The gap GAP has dimensions that allow an adhesive such as an epoxy resin to flow therethrough in its longitudinal direction. The small diameter portion 120 has an internal thread 120A on a surface of one longitudinal end, more specifically, on a surface of the end to be located near the opening of the hole 210 of the building component 200. The internal thread 120A is adapted to receive a screwed-in bolt such as a hexagon socket head bolt or a hexagon bolt. The bolt may be an example of a fastener. The internal thread 120A extends in the longitudinal direction of the small diameter portion 120 in a center portion of the transverse cross section of the small diameter portion 120. Also, the small diameter portion 120 has an external thread 120B extending in a spiral on the outer peripheral surface. The external thread 120B may be an example of irregularities for enhancing the adhesive bonding strength of the small diameter portion 120.

The irregularities for enhancing the adhesive bonding strength of the small diameter portion 120 are not limited to the external thread 120B, but may be other forms formed on the outer peripheral surface of the small diameter portion 120. Other examples of such irregularities may include a plurality of thick annular rings and a plurality of protrusions and/or recesses.

The large diameter portions 140, each of which is thick and cylindrical, are coaxially fixed to the small diameter portion 120, by brazing or the like, individually at two locations spaced apart from each other in the longitudinal direction of the small diameter portion 120, preferably, at the opposite longitudinal ends of the small diameter portion 120. The large diameter portion 140 has an outer diameter corresponding to the inner diameter of the hole 210 of the building component 200, that is, has an outer diameter substantially equal to the inner diameter of the hole 210 so as to allow accurate positioning of the GIR 100 with respect to the hole 210 when the GIR 100 is fitted in the hole 210. Thus, the large diameter portions 140 function as positioning members to position the small diameter portion 120 coaxially with the hole 210 of the building component 200 when the GIR 100 is fitted in the hole 210, and thus, the GIR 100 can be positioned in the hole 210 with improved accuracy.

Note that the shape of each large diameter portion 140 is not limited to a thick cylindrical shape. Alternatively, for example, the large diameter portion 140 may be a spring ring that is made of, for example, a cold rolled spring steel strip and has an outer diameter larger than the inner diameter of the hole 210 of the building component 200. In this case, the spring ring is elastically deformed to reduce its diameter while the GIR 100 is being fitted in the hole 210 of the building component 200, and is urged to expand its diameter by its elastic force after being fitted in the hole 210. Thus, in this case as well, the large diameter portion 140 is capable of retaining the position of the GIR 100 with respect to the hole 210.

FIGS. 3A to 3D show an example of a procedure for fixing the GIR 100 in one end surface of the building component 200 having an elongated shape.

Figure 3A:
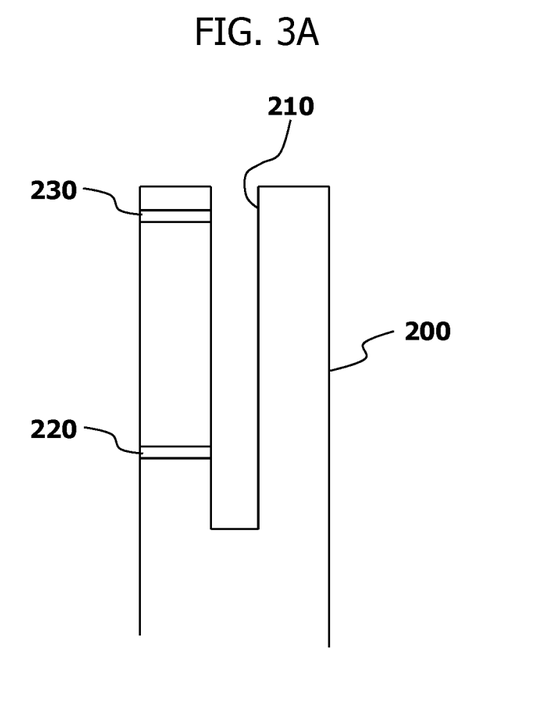
FIG. 3A illustrates the first step of a procedure for fixing a GIR to a building component.

As shown in FIG. 3A, in the first step, the hole 210 adapted to receive the GIR 100 fitted thereinto is formed on one longitudinal end surface of the building component 200 using a drill or the like. Here, the entire length of the hole 210 may be equal to or longer than the entire length of the GIR 100 so that the GIR 100 can be entirely accommodated in the hole 210. In addition, an adhesive injection hole 220 and an adhesive fill check hole 230, both of which communicate with the hole 210, are formed in one side surface of the building component 200. Specifically, the adhesive injection hole 220 and the adhesive fill check hole 230 are formed at positions that allow the holes 220, 230 communicate with the gap GAP, which is to be formed between the two large diameter portions 140 when the GIR 100 is fitted in the hole 210. The adhesive injection hole 220 is located near the bottom of the hole 210, and the adhesive fill check hole 230 is located near the opening of the hole 210. In some examples, an adhesive may be input to fill an innermost portion of the hole 210 in this first step.

Figure 3B:
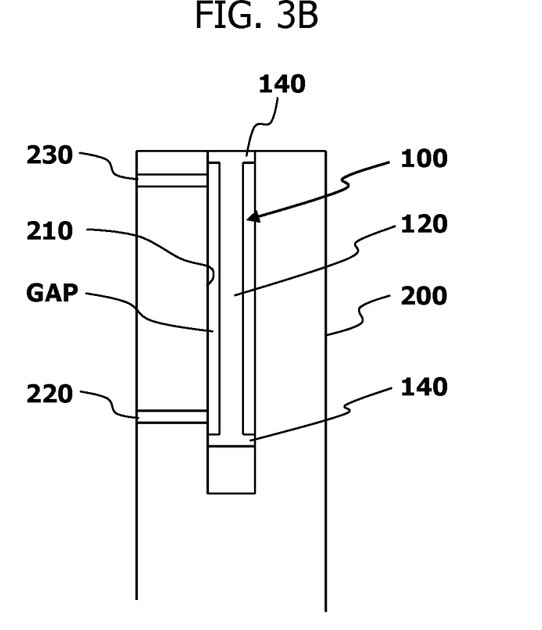
FIG. 3B illustrates the second step of the procedure for fixing the GIR to the building component.

As shown in FIG. 3B, in the second step, the GIR 100 is fitted into the hole 210 of the building component 200 until reaching a predetermined position. Here, the predetermined position may be a position that makes one surface of the upper large diameter portion 140 of the GIR 100 flush with the one end surface of the building component 200. When the GIR 100 is at this predetermined position, the GIR 100 does not project from the one end surface of the building component 200. This ensures that when an additional building component is joined onto the one end surface of the building component 200, the GIR 100 does not interfere with the additional building component. Furthermore, the two large diameter portions 140 fixed to the opposite longitudinal ends of the small diameter portion 120 minimize the inclination of the central axis of the small diameter portion 120 with respect to the central axis of the hole 210 of the building component 200.

Figure 3C:
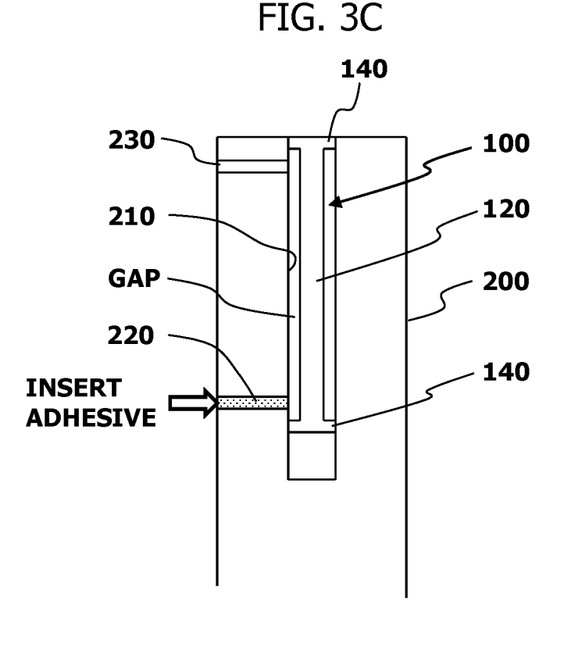
FIG. 3C illustrates the third step of the procedure for fixing the GIR to the building component.

As shown in FIG. 3C, in the third step, an adhesive is injected from the adhesive injection hole 220. The adhesive injected from the adhesive injection hole 220 is supplied to the cylindrical gap GAP between the hole 210 of the building component 200 and the GIR 100 and flows toward the opening of the hole 210 having a lower flow resistance. In this event, while flowing in the longitudinal direction of the gap GAP, the adhesive enters the valley of the external thread 120B formed on the outer peripheral surface of the small diameter portion 120 of the GIR 100.

Figure 3D:
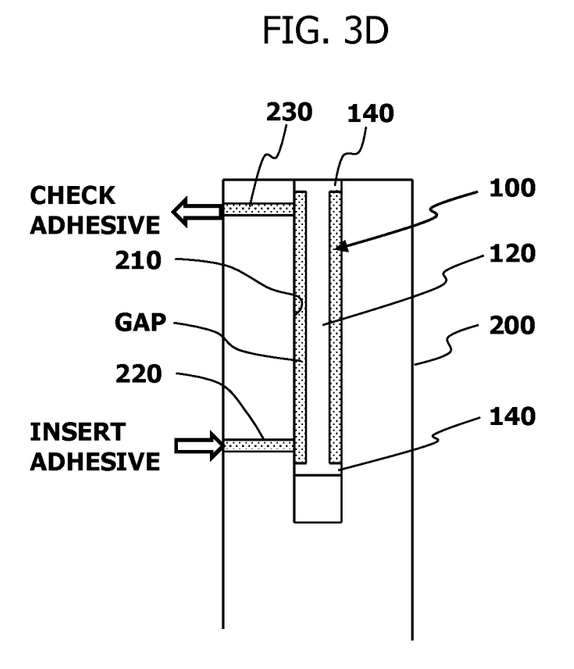
FIG. 3D illustrates the fourth step of the procedure for fixing the GIR to the building component.

As shown in FIG. 3D, in the fourth step, it is checked whether the adhesive has flowed out from the adhesive fill check hole 230. The injection of the adhesive is continued until the adhesive flows out from the adhesive fill check hole 230, since such a state may be considered to indicate that the gap GAP has been filled up with the adhesive. When it is confirmed that the adhesive has flowed out from the adhesive fill check hole 230, the injection of the adhesive is stopped and the adhesive is cured until sufficiently hardened.

The adhesive input to fill the gap GAP bonds the GIR 100 to the building component 200. Here, the adhesive also fills the valley of the external thread 120B of the small diameter portion 120. This suppresses the movement of the GIR 100 in the longitudinal direction of the hole 210, and improves the fixing strength of the GIR 100 to the building component 200.

Figure 4:
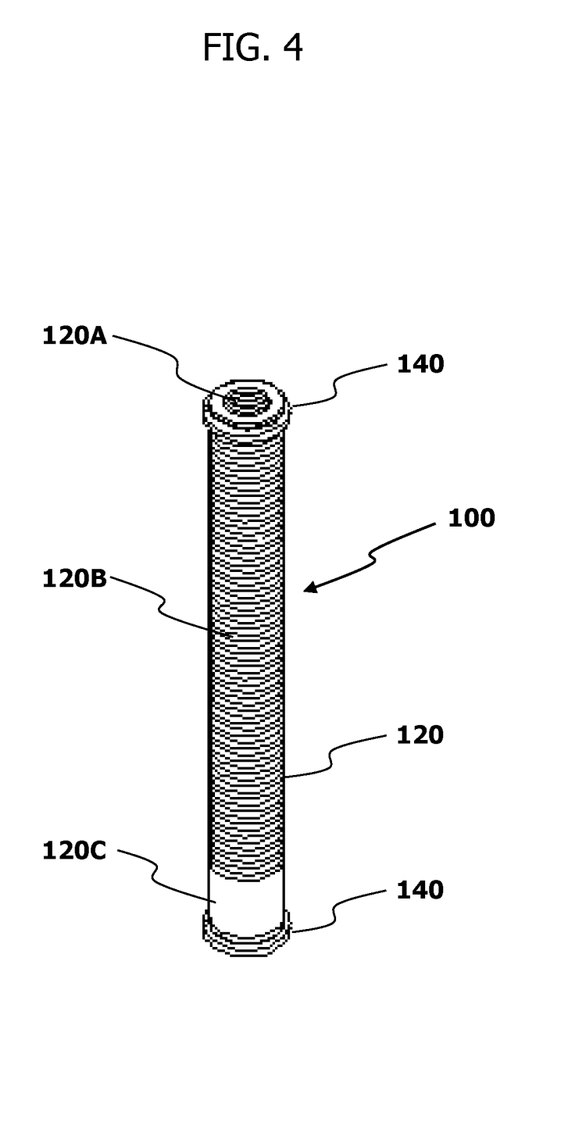
FIG. 4 is a perspective view of a first modified example of the GIR for joining building components together.

In some cases, the distance between the adhesive injection hole 220 and the small diameter portion 120 of the GIR 100 may be very small and may make it difficult to inject the adhesive into the gap GAP. In such a case, as shown in FIG. 4, the small diameter portion 120 may have a segment with a circumferential surface 120C having an outer diameter smaller than the outer diameter of the external thread 120B (that is, smaller than the outer diameter of the small diameter portion 120). Specifically, the segment, which is obtained by dividing the small diameter portion 120 in its longitudinal direction, extends in a predetermined length in the longitudinal direction of the small diameter portion 120 so as to face the opening of the adhesive injection hole 220. This makes it possible to increase the outer diameter of the small diameter portion 120 of the GIR 100, and thus, to use a bolt having a greater nominal diameter. Accordingly, the joining strength of the building component 200 can be improved.

Figure 5:
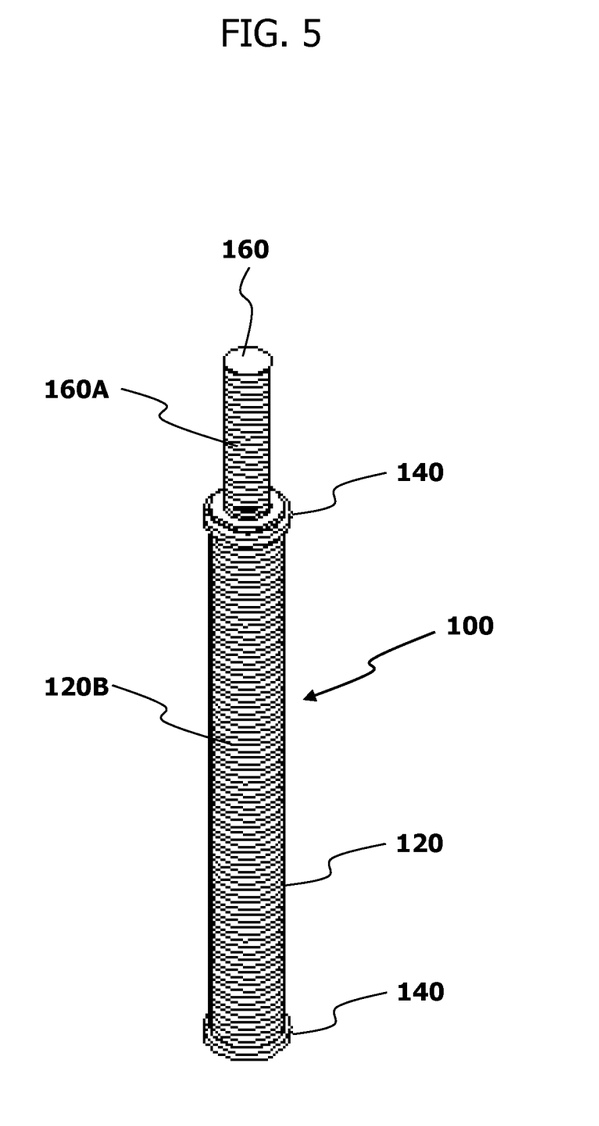
FIG. 5 is a perspective view of a second modified example of the GIR for joining building components together.

When a nut is used as a fastener, a joining portion 160 having an external thread 160A on the outer peripheral surface may be integrally coupled onto a surface of the one end of the small diameter portion 120 of the GIR 100 instead of forming the internal thread 120A thereon, as shown in FIG. 5. Specifically, the joining portion 160 extends in the longitudinal direction of the small diameter portion 120 in a center portion of the transverse cross section of the small diameter portion 120 and has the external thread 160A at least in a distal end section thereof. The entire length of the joining portion 160 may be determined according to, for example, what building components are joined together with the GIR 100. In this configuration as well, the small diameter portion 120 of the GIR 100 may have the circumferential surface 120C as shown in FIG. 4.

Next, a metal joining bracket adapted to be used in conjunction with the GIR 100 to join building components together.

Figure 6A:
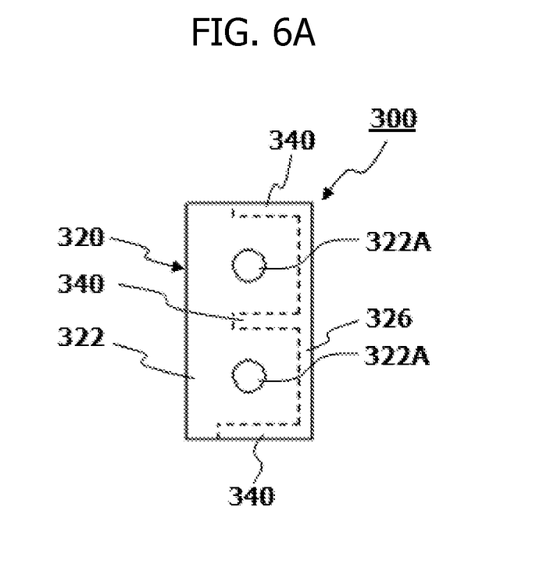
FIG. 6A is a plan view of an example of a metal joining bracket.
Figure 6B:
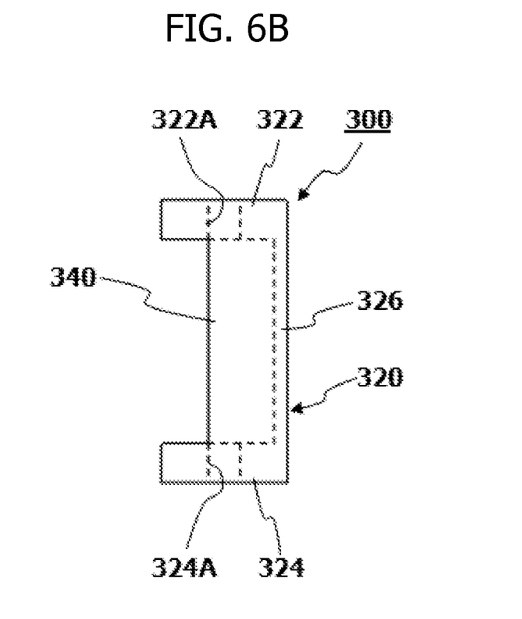
FIG. 6B is a side view of an example of the metal joining bracket.
Figure 6C:
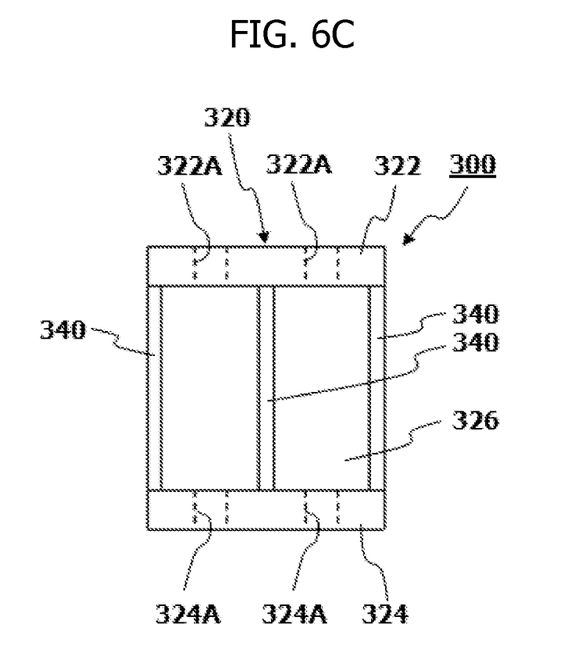
FIG. 6C is a front view of an example of the metal joining bracket.

FIGS. 6A to 6C show an example of a metal joining bracket 300.

The metal joining bracket 300 is made of, for example, a rolled steel for general structural applications, such as SS400, and has a channel-shaped (C-shaped) body member 320 and three rectangular reinforcing members 340 for reinforcing the body member 320.

The body member 320 has a top plate 322, a bottom plate 324, and a side plate 326, each of which has a rectangular shape. The top plate 322 and bottom plate 324 are joined by welding or the like onto the opposite (upper and lower) ends of the side plate 326 so as to be parallel with each other. The top plate 322 has insertion holes 322A, each adapted to receive the shank of a bolt, individually at two locations spaced apart from each other in the longitudinal direction of the top plate 322. The bolt may be an example of the fastener. Similarly, the bottom plate 324 has insertion holes 324A, each adapted to receive the shank of a bolt, individually at two locations spaced apart from each other in the longitudinal direction of the bottom plate 324. The bolt may also be an example of the fastener.

The reinforcing members 340 are joined onto the inner surfaces of the top plate 322, bottom plate 324 and side plate 326 of the body member 320 by welding or the like so that each of the plate surfaces of the reinforcing members 340 lies in a plane orthogonal to the top plate 322, bottom plate 324 and side plate 326. More specifically, the reinforcing members 340 are joined individually at the center and opposite ends of the top plate 322, bottom plate 324 and side plate 326, in a plan view. In the example shown in FIGS. 6A to 6C, each reinforcing member 340 has a width that partially fills the corresponding cross section of the channel-shaped opening. Note, however, that each reinforcing member 340 may entirely fill this cross section of the channel-shaped opening as long as the function of the tool for fastening the fastener may be enabled.

Next, description will be given of a structure built by using the GIRs 100 and metal joining brackets 300 to join posts and a beam which are examples of building components.

First Embodiment

Figure 7:
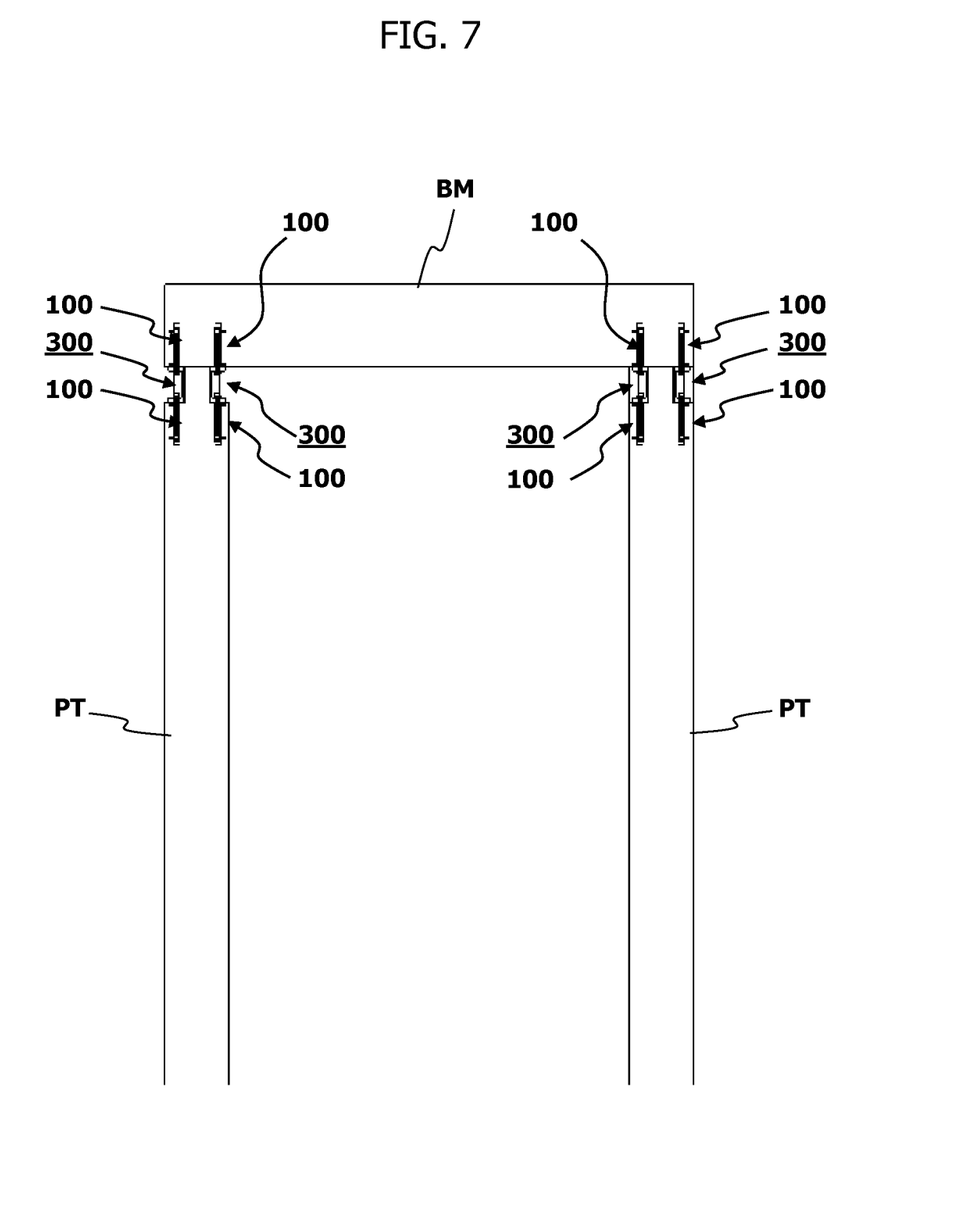
FIG. 7 is a front view of an example of a beam-dominated (beam-post) structure.

FIG. 7 shows an example of a beam-dominated (beam-post) structure in which a beam BM is joined onto the upper surfaces of a pair of posts PT.

Each post PT has an upper end portion with a stepped shape. Specifically, a center area of the upper end portion projects upward so that the metal joining brackets 300 may be fitted onto the opposite side surfaces of the post PT in the longitudinal direction of the beam BM. In addition, by the aforementioned fixing method, four GIRs 100 are fixed onto the lower step surfaces of the stepped portion of each post PT at the locations that are to face the insertion holes 324A of the bottom plates 324 of two metal joining brackets 300. Similarly, by the aforementioned fixing method, eight GIRs 100 are fixed onto right and left areas of the lower surface of the beam BM at the locations that are to face the insertion holes 322A of the top plates 322 of the four metal joining brackets 300.

In the building process, the beam BM is placed on the upper surfaces of the pair of posts PT, and the metal joining brackets 300 are then fitted onto the opposite side surfaces of the stepped portion of each post PT. After that, fasteners, each including, for example, a hexagon socket head bolt and a washer are inserted through the insertion holes 322A, 324A of the metal joining brackets 300, and screwed into the internal threads 120A of the GIRs 100. In some examples, a member for temporarily joining the posts PT and the beam BM may be used when the beam BM is placed on the upper surfaces of the posts PT.

In this way, the first embodiment provides improved positioning accuracy of the GIRs 100 with respect to the posts PT and beam BM, and thus, provides improved joining accuracy between the beam BM and the posts PT, such as minimizing a position gap between the beam BM and each post PT. As a result, the resultant complete structure may have an improved accuracy and thus, has improved quality.

Second Embodiment

Figure 8:
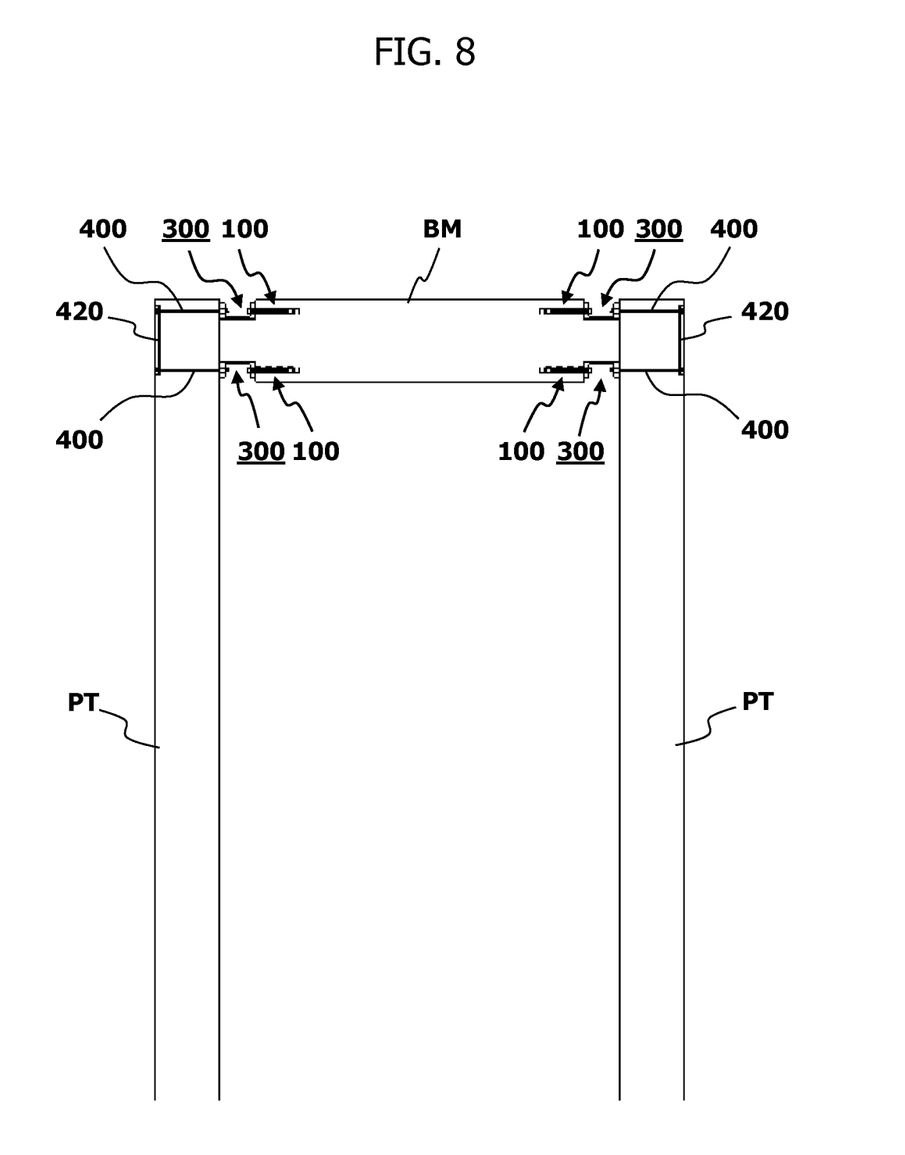
FIG. 8 is a front view of an example of a post-dominated (post-beam) structure.

FIG. 8 shows an example of a post-dominated (post-beam) structure in which a beam BM is joined onto side surfaces of a pair of posts PT.

The beam BM has portions each having a stepped shape at the opposite longitudinal ends. Specifically, a center area of each of these end portions projects laterally outward so that the metal joining brackets 300 may be fitted onto the upper and lower surfaces of the beam BM. In addition, by the aforementioned fixing method, four GIRs 100 are fixed onto the lower step surfaces of the stepped portions of the beam BM at the locations that are to face the corresponding ones of the insertion holes 322A, 324A of two metal joining brackets 300. Furthermore, each post PT has through holes (not shown) in an upper end portion. Specifically, each of these through holes extends between opposite side surfaces of the post PT at the locations that are to face the remaining ones of the insertion holes 322A, 324A of the corresponding two metal joining brackets 300.

In the building process, the beam BM is placed between the pair of posts PT, and the metal joining brackets 300 are then fitted onto the upper and lower surfaces of the stepped portions of the beam BM. After that, a fastener including, for example, a hexagon socket head bolt and a washer, is inserted through the insertion hole 322A or 324A of each metal joining bracket 300, and screwed into the internal thread 120A of the corresponding GIR 100. In addition, bolts 400 are inserted through the through holes of the posts PT from the surfaces, not facing the beam BM, of the posts PT so that the distal ends of the bolts 400 are inserted through the remaining ones of the insertion holes 322A, 324A of the metal joining brackets 300. Then, fasteners each including, for example, a nut and a washer, are screwed onto the portions, projecting from these insertion holes 322A, 324A of the metal joining brackets 300, of the bolts 400. In some examples, a member for temporarily joining the posts PT and the beam BM may be used when the beam BM is placed between the posts PT. Although not mentioned above, to suppress digging of the heads of the bolts 400 into the posts PT, metal plates 420 having insertion holes adapted to receive the shanks of the bolts 400 therethrough are attached onto the surfaces, not facing the beam BM, of the posts PT.

In this way, as with the first embodiment, the second embodiment provides improved positioning accuracy of the GIRs 100 with respect to the posts PT and beam BM, and thus, provides improved joining accuracy between the beam BM and the posts PT, such as minimizing a position gap between the beam BM and each post PT. As a result, the resultant complete structure may have an improved accuracy and thus, has improved quality. Note that, in place of the insertion holes adapted to receive the bolts 400 therethrough, the GIRs 100 may be fixed in the upper end portion of each post PT.

Third Embodiment

Figure 9:
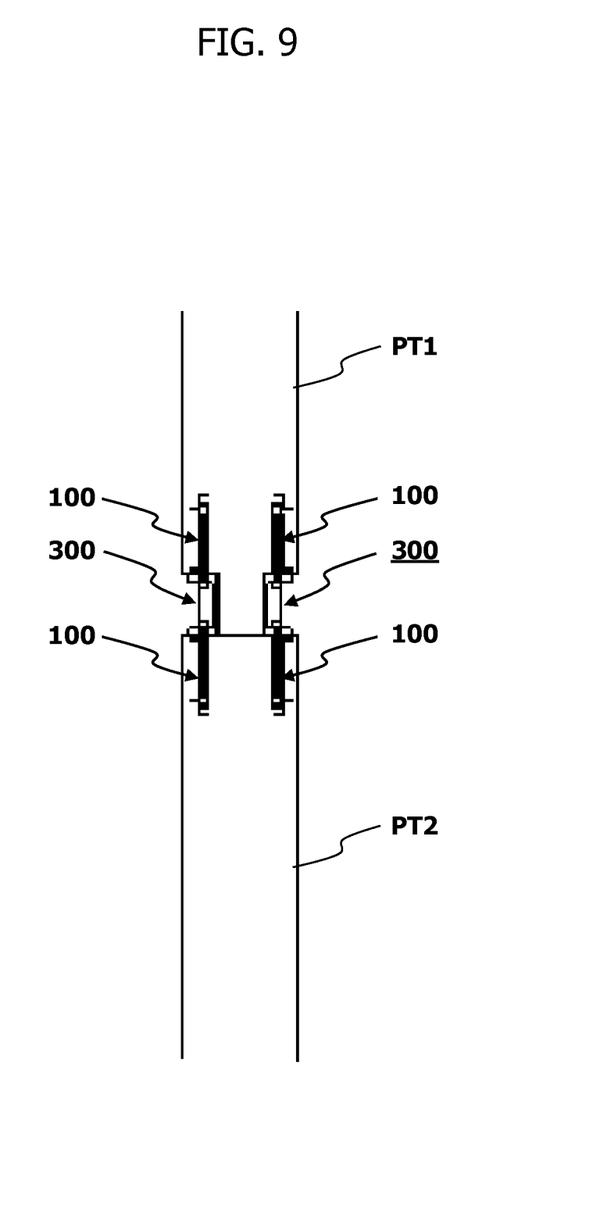
FIG. 9 is a front view of an example of a structure in which upper and lower posts are joined together.

FIG. 9 shows an example of a structure in which an upper post PT1 and a lower post PT2 are linearly joined together.

The upper post PT1 has a lower end portion with a stepped shape. Specifically, a center area of the lower end portion projects downward so that the metal joining brackets 300 may be fitted onto the opposite side surfaces of the lower end portion. In addition, by the aforementioned fixing method, four GIRs 100 are fixed onto the upper step surfaces of the stepped portion of the post PT1 at the locations that are to face the insertion holes 322A of the top plates 322 of two metal joining brackets 300. Similarly, by the aforementioned fixing method, four GIRs 100 are fixed onto the upper end surface of the lower post PT2 at the locations that are to face the insertion holes 324A of the bottom plates 324 of the two metal joining brackets 300.

In the building process, the post PT1 is placed on the post PT2 in a straight line with the lower end of the post PT1 in contact with the upper end of the post PT2, and the metal joining brackets 300 are then fitted onto the opposite side surfaces of the stepped portion of the upper post PT1. After that, fasteners, each including, for example, a hexagon socket head bolt and a washer are inserted through the insertion holes 322A, 324A of the metal joining brackets 300, and screwed into the internal threads 120A of the GIRs 100. In some examples, a member for temporarily joining the posts PT1, PT2 may be used when the post PT1 is placed on the post PT2.

In this way, the third embodiment provides improved positioning accuracy of the GIRs 100 with respect to the posts PT1, PT2, and thus, provides improved joining accuracy between the posts PT1, PT2, such as minimizing a position gap between the posts PT1, PT2. As a result, the resultant complete structure may have an improved accuracy and thus, has improved quality. Note that application of the third embodiment is not limited to a structure in which the upper and lower posts are lineally joined together, but the third embodiment may also be applied to a structure in which two horizontal structural members, such as beams or groundsills, are lineally joined together.

Furthermore, application of the GIRs 100 is not limited to the structures according to the first to third embodiments, but the GIRs 100 may be used in various locations of wooden buildings. Thus, when used in a wooden building, the GIRs 100 provides the resultant complete building an improved quality, such as an improved load-bearing capacity to resist external forces due to earthquakes, typhoons, and the like.

REFERENCE SYMBOL LIST

100 GIR (Metal joint)
120 Small diameter portion
120A Internal thread
120B External thread (Irregularities)
120C Circumferential surface
140 Large diameter portion
160 Joining portion
160A External thread
200 Building component
210 Hole
PT, PT1, PT2 Post
BM Beam

The invention claimed is:

1. A metal joint adapted to be fitted into a hole formed in one end surface of a building component having an elongated shape and fixed to the hole with an adhesive, the metal joint comprising:
a small diameter portion having an elongated shape and an outer diameter smaller than an inner diameter of the hole; and
two large diameter portions fixed to the small diameter portion individually at two locations spaced apart from each other in a longitudinal direction of the small diameter portion, each large diameter portion having an outer diameter corresponding to the inner diameter of the hole, each of the large diameter portions comprising a spring ring, each spring ring having an outer diameter larger than the inner diameter of the hole, each spring ring being configured to retain a position with respect to the hole by elastic force,
wherein irregularities are formed on an outer peripheral surface of the small diameter portion in a section between the two large diameter portions,
the hole for fitting the metal joint being formed in the one end surface of the building component, the building component also having an adhesive injection hole and an adhesive fill check hole, both of which communicate with the hole for fitting the metal joint, and both of which are formed in a same side surface of the building component, the adhesive injection hole disposed below the adhesive fill check hole in a direction extending from the one end surface towards a bottom of the hole;
the metal joint being configured to be fit into the hole formed in the building component until reaching a predetermined position;
the adhesive injection hole being configured to receive the adhesive into a gap between the small diameter portion of the metal joint and the building component; and
the adhesive fill check hole being configured to receive outflow of the adhesive out of the gap.

2. The metal joint according to claim 1, wherein the large diameter portions are fixed at opposite longitudinal ends of the small diameter portion.

3. The metal joint according to claim 1, wherein the irregularities comprise an external thread.

4. The metal joint according to claim 1, wherein the irregularities comprise a plurality of annular rings.

5. The metal joint according to claim 1, wherein the irregularities comprise a plurality of protrusions and/or recesses.

6. The metal joint according to claim 1, wherein the small diameter portion has a segment with a circumferential surface having an outer diameter smaller than the outer diameter of the small diameter portion, the segment being obtained by dividing the section of the small diameter portion between the two large diameter portions in the longitudinal direction of the small diameter portion.

7. The metal joint according to claim 1, wherein an internal thread is formed on a surface of one longitudinal end of the small diameter portion.

8. The metal joint according to claim 1, wherein a joining portion having an external thread in at least a distal end section thereof is coupled onto a surface of one longitudinal end of the small diameter portion.

9. The metal joint according to claim 8, wherein the joining portion is integrally coupled to the small diameter portion.

\* \* \* \* \*